(12) United States Patent
Barcella et al.

(10) Patent No.: US 9,473,429 B2
(45) Date of Patent: Oct. 18, 2016

(54) LOW LATENCY MESSAGING CHAT SERVER

(71) Applicant: International Business Machines Corporation, Armonk, NY (US)

(72) Inventors: Marco Barcella, Stamford, CT (US); Gennaro A. Cuomo, Cary, NC (US); Lorenzo J. de la Vega, Sandy Hook, CT (US); Dinakaran Joseph, Apex, NC (US); Victor S. Moore, Lake City, FL (US); Richard M. Poundstone, Ridgefield, CT (US); Rishi Vaish, San Carlos, CA (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 14/060,181

(22) Filed: Oct. 22, 2013

(65) Prior Publication Data

US 2014/0173004 A1 Jun. 19, 2014

Related U.S. Application Data

(63) Continuation of application No. 13/715,457, filed on Dec. 14, 2012.

(51) Int. Cl.
| | |
|---|---|
| G06F 15/16 | (2006.01) |
| H04L 12/58 | (2006.01) |
| G06F 17/24 | (2006.01) |
| G06F 17/27 | (2006.01) |
| H04L 12/721 | (2013.01) |

(52) U.S. Cl.
CPC ............. *H04L 51/04* (2013.01); *G06F 17/248* (2013.01); *G06F 17/2705* (2013.01); *H04L 45/14* (2013.01); *H04L 51/32* (2013.01)

(58) Field of Classification Search
CPC ....... H04L 51/04; H04L 51/32; H04L 51/45; H04L 51/14; G06F 17/248; G06F 17/2705
USPC .......................... 709/204, 205, 206, 217, 219
See application file for complete search history.

(56) References Cited

U.S. PATENT DOCUMENTS

| | | | |
|---|---|---|---|
| 6,557,027 B1 | 4/2003 | Cragun | |
| 6,765,931 B1 | 7/2004 | Rabenko et al. | |
| 7,080,139 B1 * | 7/2006 | Briggs et al. | 709/224 |

(Continued)

OTHER PUBLICATIONS

Gilbert et al., The Duality between Message Routing and Epidemic Data Replication, Proceedings of the Eighth ACM Workshop on Hot Topics in Networks (Hot Nets 2009), Oct. 2009, pp. 1-6.

(Continued)

*Primary Examiner* — Viet Vu
(74) *Attorney, Agent, or Firm* — Scully, Scott, Murphy & Presser, P.C.; Stephen R. Yoder

(57) ABSTRACT

A low latency messaging chat service may provide for receiving from a chat client a connection request via a network; authenticating the chat client by a registration process; allocating to the chat client at least a first topic corresponding to a first message queue and a second topic corresponding to a second message queue, the first topic assigned a first format and the second topic assigned a second format; enabling the chat client to post messages in the first topic; and enabling the chat client to receive messages in the second topic.

12 Claims, 6 Drawing Sheets

(56) References Cited

U.S. PATENT DOCUMENTS

| | | |
|---|---|---|
| 7,206,813 B2 | 4/2007 | Dunbar et al. |
| 7,295,657 B1 | 11/2007 | Keohane et al. |
| 7,631,315 B2 | 12/2009 | Dadiomov et al. |
| 7,702,739 B1 | 4/2010 | Cheng et al. |
| 2002/0174248 A1 | 11/2002 | Morriss |
| 2002/0194347 A1 | 12/2002 | Koo et al. |
| 2003/0003953 A1 | 1/2003 | Houplain |
| 2004/0117444 A1 | 6/2004 | Goodman et al. |
| 2006/0265454 A1 | 11/2006 | Forlenza et al. |
| 2007/0136428 A1* | 6/2007 | Boutboul et al. .............. 709/206 |
| 2007/0143472 A1* | 6/2007 | Clark et al. .................... 709/224 |
| 2008/0065725 A1 | 3/2008 | Choi |
| 2008/0281936 A1 | 11/2008 | Li et al. |
| 2009/0006410 A1* | 1/2009 | Choi ........................ G09B 7/00 |
| 2009/0068631 A1* | 3/2009 | Halliwell ............... G09B 19/18 434/362 |
| 2010/0191525 A1 | 7/2010 | Rabenko et al. |
| 2011/0231495 A1 | 9/2011 | Westen et al. |
| 2011/0276636 A1 | 11/2011 | Cheng et al. |
| 2012/0071855 A1 | 3/2012 | Pecora et al. |
| 2012/0179767 A1* | 7/2012 | Clarke et al. ................. 709/206 |
| 2012/0192205 A1 | 7/2012 | Bhasin et al. |
| 2012/0198004 A1 | 8/2012 | Watte |
| 2012/0244505 A1* | 9/2012 | Lang ........................ G09B 5/06 434/322 |
| 2015/0222571 A1 | 8/2015 | Cuomo et al. |

OTHER PUBLICATIONS

Office Action dated Apr. 23, 2015 received in the parent U.S. Appl. No. 13/715,457.

International Search Report together with the Written Opinion of the International Searching Authority dated Mar. 6, 2014 from International Application No. PCT/CA2013/050960.

Office Action dated Sep. 28, 2015 received in U.S. Appl. No. 14/568,869.

Office Action dated Aug. 5, 2015 received in the parent U.S. Appl. No. 13/715,457.

Office Action dated Sep. 25, 2015 received in U.S. Appl. No. 14/171,983.

Office Action dated Apr. 1, 2016 received in parent U.S. Appl. No. 13/715,457, 12 pages.

* cited by examiner

LOW LATENCY MESSAGING CHAT SERVER

CROSS-REFERENCE TO RELATED APPLICATIONS

This application is a continuation of U.S. Ser. No. 13/715,457, filed on Dec. 14, 2012, the entire content and disclosure of which is incorporated herein by reference.

FIELD

The present application relates generally to computers, computer applications and communications, and more particularly to messaging chat service.

BACKGROUND

Chat service provides ability to communicate, e.g., by instant messaging over the Internet. An example of a chat service is International Business Machines®'s Sametime®, which among other features, enables social communication by instant messaging among users. Other known methodologies offer publish-subscribe service for sending instant messages. Yet another known methodology provides a feature of pushing a system to publish message to one or more buddies on an instant messenger. Still yet another known methodology provides a feature of publishing presence status information to one or more subscribers subscribing to a messaging service.

BRIEF SUMMARY

A method for a low latency messaging chat service, in one aspect, may comprise receiving from a chat client a connection request via a network. The method may also comprise authenticating the chat client by a registration process. The method may further comprise allocating to the chat client at least a first topic corresponding to a first message queue and a second topic corresponding to a second message queue, the first topic assigned a first format and the second topic assigned a second format. The method may yet further comprise enabling the chat client to post messages in the first topic. The method may still further comprise enabling the chat client to receive messages in the second topic.

In another aspect, a method for a low latency messaging chat service may comprise connecting and registering by a chat client with a chat server. The method may also comprise receiving at least a first topic corresponding to a first message queue and a second topic corresponding to a second message queue, the first topic assigned a first format and the second topic assigned a second format. The method may also comprise subscribing to the first topic for posting availability status in the first topic. The method may further comprise subscribing to the second topic for receiving a chat message from one or more other chat clients.

A system for a low latency messaging chat server, in one aspect, may comprise a module executing on a processor operable to receive from a chat client a connection request via a network. The module may be further operable to authenticate the chat client by a registration process. The module may be yet further operable to allocate to the chat client at least a first topic corresponding to a first message queue and a second topic corresponding to a second message queue, the first topic assigned a first format and the second topic assigned a second format. The module may be further operable to enable the chat client to post messages in the first topic, and enable the chat client to receive messages in the second topic.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
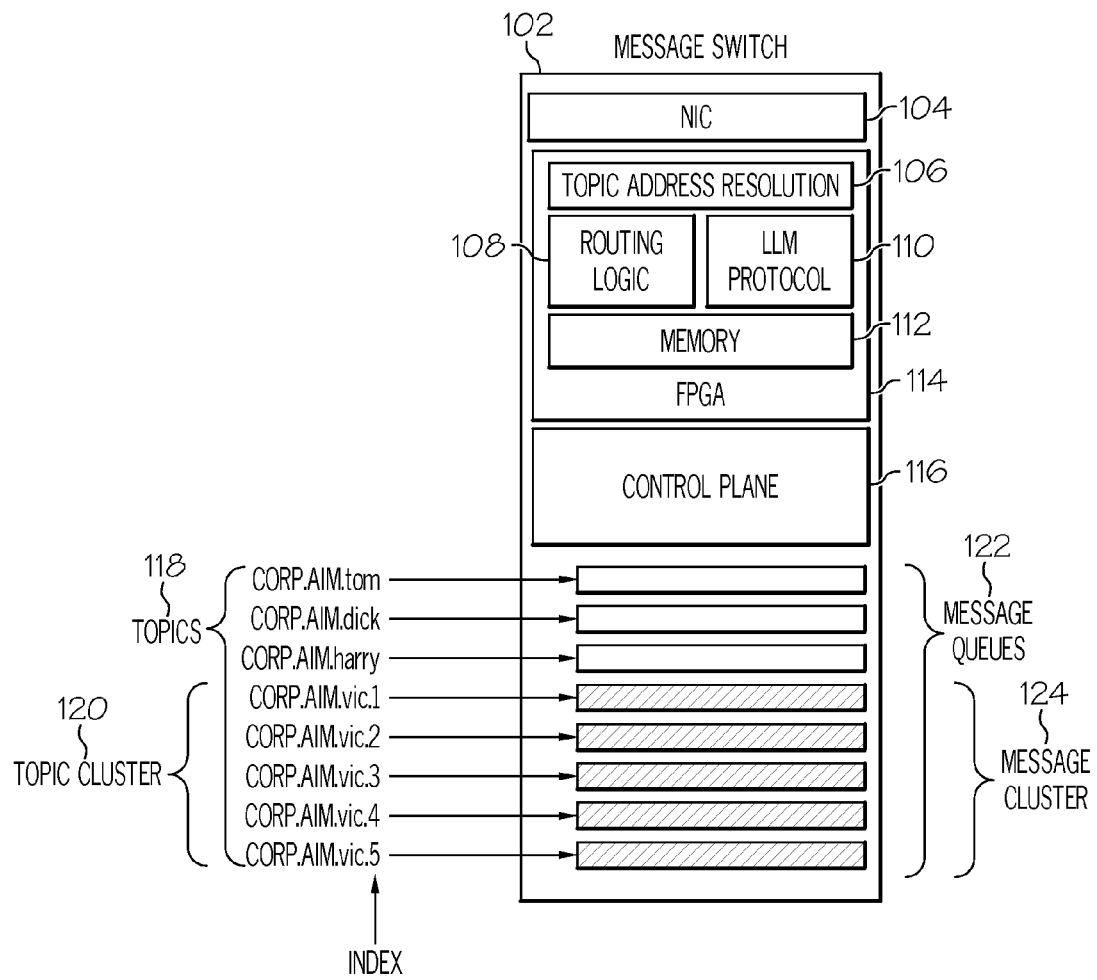
FIG. 1 illustrates a message switch in one embodiment of the present disclosure.

The present disclosure describes a scalable chat server and a method of building the same. The chat server in one embodiment may provide scalability to millions of chat clients. The chat server, in one aspect, may be geographically distributed with ease and utility. The chat server in another aspect, may use familiar publish-subscribe and low latency messaging (LLM) concepts.

The present disclosure uses the following terminologies in describing a LLM chat server and methodology.

A name is an alphanumeric string.

A dictionary is a collection of unique names, and each is assigned a data type.

A format domain is a collection of names taken from the same dictionary.

A format is an ordered list that contains a version number followed by a subset of names extracted from a format domain. In the context of the present disclosure, a format describes the structure of a message payload.

A topic is a name given to a message queue.

A message queue is associated with only one topic in one embodiment of the present disclosure. It is addressed by that topic and has a storage structure for saving messages associated with that topic. Messages are retrieved from a message queue in first-in-first-out (FIFO) order.

A message payload is an ordered list of data. Recall that a format defines the data format of a payload.

A message includes a topic, a format, and a payload in one embodiment of the present disclosure.

Messages are published to a topic. To publish a message to topic XX means to send that message to the message queue named XX. The messages in a message queue all have the same topic and format.

To subscribe to a topic means that the message queue for that topic will send to the subscriber all of the messages it receives, in one embodiment of the present disclosure. A subscriber can poll the message queue for new messages or the subscriber can assign a callback to the message queue, to directly receive messages as they arrive.

A range is a list of topics to which a given user is allowed to publish.

A domain is the list of topics to which a user can subscribe.

An Access Control List (ACL) defines who can subscribe or publish to a Topic. In one embodiment of the present disclosure, there is one ACL for subscription and another ACL for publish.

A message switch ingests a message, strips out the enclosed topic, and routes that message to the message queue with the same name as that topic.

A topic cluster is a set of identical topics that are distinguished from one to another by appending to each a unique index such as "0.1" or "0.2" in one embodiment of the present disclosure.

A message cluster is a set of identical message queues. The names for the message queues in a message cluster are themselves a topic cluster. Again, these names are made unique by appending to each a unique index in one embodiment of the present disclosure.

In one embodiment of the present disclosure, two topic name indexes have special meanings; namely, e.g., the "*" and "#". Both are wildcards. The "*" index selects at random one member of a message cluster, while the "#" selects one member on a round robin basis. These wildcards specify how to spray received messages across a cluster of message queues. Other characters may be used as wildcards.

To a message switch a topic name like "Corp.AIM.vic.1" is just a name for a message queue. In one embodiment of the present disclosure, the characters, periods, have no special significance. Only when the right most character is a "*" or "#" does a message switch do anything special. For example, the string "name.*" is converted to a string where the rightmost character is replaced by a random number between 1 and n, where n is the number of message queues in the cluster "name". A message switch would replace "#" with a round robin value between 1 and n. Other characters may be used to convert the wildcard. Once this substitution is completed, a message switch processes the topic name like any other name given to a message queue.

In one embodiment of the present disclosure, topic names are partitioned by "periods" to specify designations like company name, division, and service to implement multiple tenant environments.

FIG. 1 illustrates a message switch in one embodiment of the present disclosure. A chat service of the present disclosure may implement both a chat client and a chat server. In one aspect, the resulting chat server may be superior to existing chat servers in scalability, architectural flexibility and performance. In one embodiment of the present disclosure, a message switch or router 102 functions as a chat server. The message switch 102 of the present disclosure in one embodiment may include a network interface card 104 for connecting the message switch 102 to a computer network and one or more processors or integrated circuits such as field programmable gate array (FPGA) 114. FPGA 114 or the like component may comprise a topic address resolution module 106 for resolving topic addresses, a routing logic 108, an LLM protocol 110, memory 112. A control plane 116 manages incoming packets. The message switch 102 may also include one or more topics 118 (message queues 122) and topic clusters 120 (message clusters 124).

Figure 2:
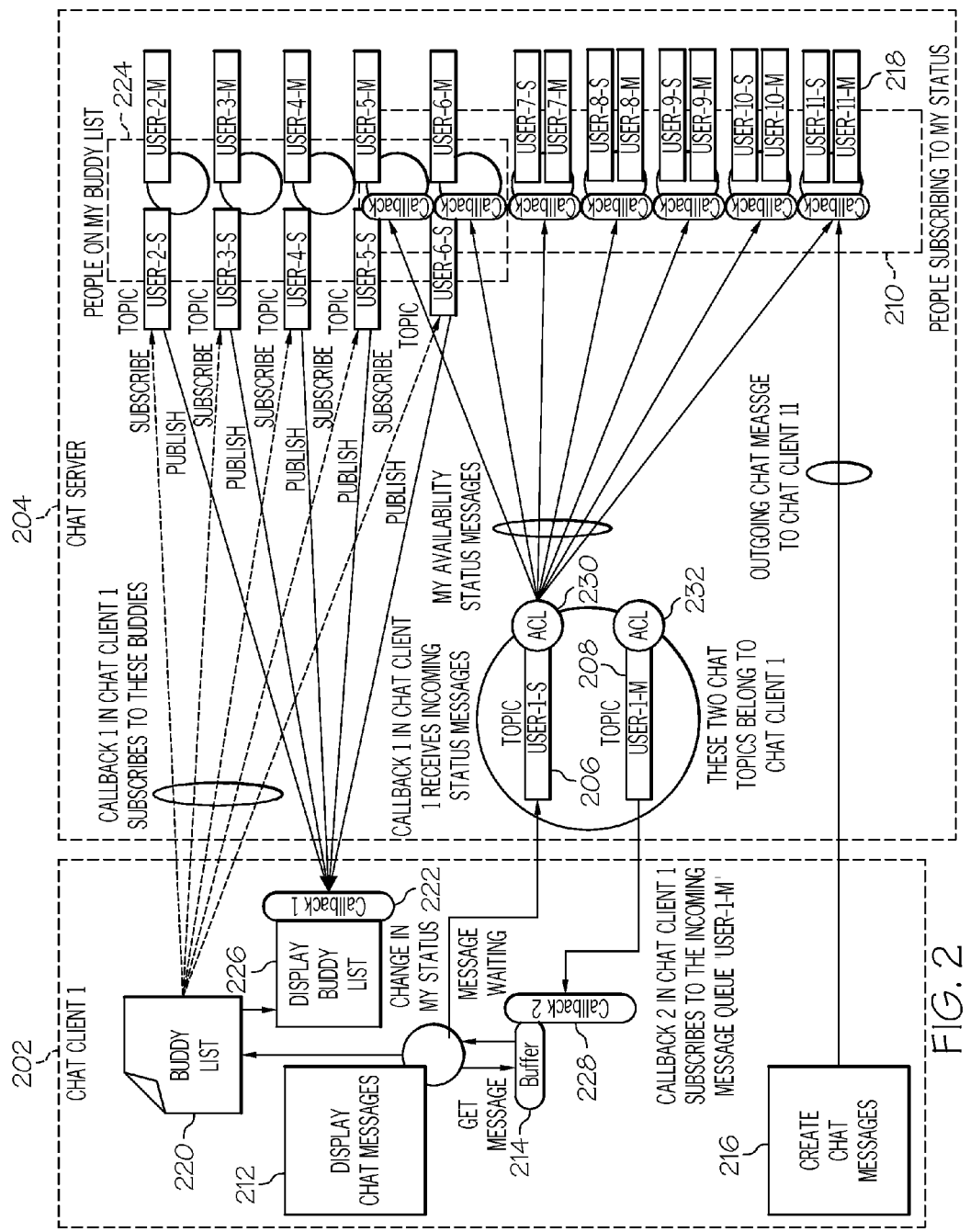
FIG. 2 is a schematic diagram illustrating a chat client connected to a chat server in one embodiment of the present disclosure.

FIG. 2 is a schematic diagram illustrating a chat client connected to a chat server in one embodiment of the present disclosure. A chat client is shown at 202 on the left and the chat server 204 is shown with a collection of topic queues stacked vertically on the right. The chat client 202 connects to the chat server 204 via a network and a registration process authenticates the client 202 and allocates to it two topic names and corresponding message queues; namely "username.S" 206 and "username.M" 208. In one embodiment of the present disclosure the queues are allocated in the chat server 204 or memory device associated with the chat server 204.

In one embodiment of the present disclosure, "username.S" 206 is a topic that anyone can subscribe to but only "username" can post to (e.g., an ACL 230 governs the access). Messages in this queue 206 convey the availability status of "username" to other chat clients. The status choices are "not available", "available", "in a meeting", "do not disturb", and so on. Chat client "username" 202 posts a message to "username.S" 206 whenever its status changes and/or optionally at regular heartbeat intervals.

Other chat clients subscribe to "username.S" 206, as shown in FIG. 2, if they wish to monitor the availability status of "username". In addition, when one chat client sends a message to another chat client it may first confirms the receiving client's availability (via its status queue) to receive a message.

For simplicity, all topic names ending in ".S" (or another such designated character, string, or schema) are said to be "status queues" and each is assigned the same format, called the "status format". An ACL 230 guarantees that only "username" can post to "username.S" 206, and anyone else can subscribe to it. The format defines the message format of status messages.

The second topic queue assigned to the chat client "username" on registration is "username.M" 208. This queue receives messages from other chat clients with respect allocated queues (e.g., shown at 210). An ACL 232 exclusively entitles "username" to subscribe to "username.M" 208, while giving everyone else only "write" privileges. The "username" chat client 202, e.g., via callback functionality 228, subscribes to "username.M" 208 to receive in the associated callback buffer 214 the messages posted to it by other chat clients. These messages may be displayed or otherwise presented, e.g., in a chat window 212, to the chat client user.

If the user wishes to send a message to another chat client, say "foofoo", it simply posts the message to "foofoo.M". In one embodiment of the present disclosure, before sending the message, "foofoo.S" is consulted to confirm that "foofoo" is available. For instance, the chat client 202 may, for example, via a user interface or like module 216 may send a message to another chat client's message queue 218.

All topic queue names ending in ".M" (or another such designated character, string, or schema) are said to be "message" queues and have the same assigned format called the "message format". This format describes the payload of chat message posted to a chat client's message queue.

A typical message format includes a string for a user name and another string for the chat message. The format can be as simple or as complex as desired. It may also be changed at will. In one embodiment of the present disclosure, the only constraint is that the message queue be capable of associating its messages with the proper message format. It is also possible to embed the format within the message itself.

The chat client 202 may also keep a buddy list 220 that comprises one or more users with whom the user of the chat client 202 communicates. A callback functionality 222, for instance, may subscribe to the chat clients (e.g., 224) associated with those users, for instance, the status queues of those chat clients and receive incoming status messages. The buddy list 220 may be presented to the user of the chat client 202, for example, via a user interface display 226 or the like.

Figure 3:
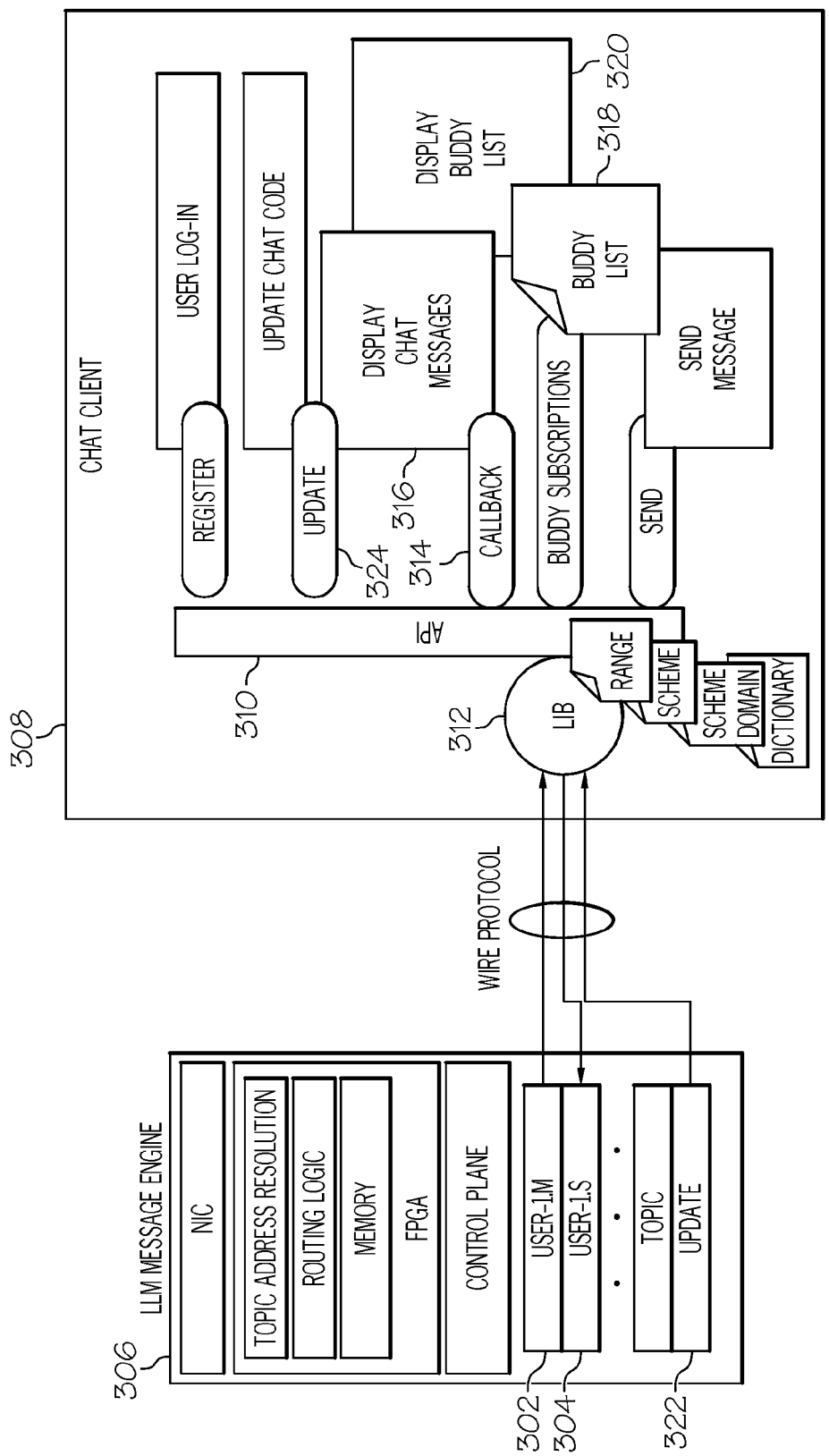
FIG. 3 illustrates a chat client connected to a LLM message switch where a Low Latency Messaging (LLM) engine serves as the chat server in one embodiment of the present disclosure.

FIG. 3 illustrates a chat client connected to a LLM message switch where a Low Latency Messaging (LLM) engine serves as the chat server in one embodiment of the present disclosure. In this scenario, the chat client 308 makes itself known to the LLM engine 306 by registering, which authenticates the client 308 to the server 306. The server 306 in turn allocates to the chat client 308 a message queue 302 and a status queue 304. These are depicted in FIG. 3 as User-1.M 302 and User-1.S 304, respectively.

The chat client 308 registers via an API 310. This API 310 and its supporting code are labeled in FIG. 3 as "Lib" 312, "Callback" 314 and "API" 310. This API 310 may be used to subscribe to topics and to post messages to topics. In one embodiment of the present disclosure, for each topic subscription the API 310 provides a "callback" buffer to receive the messages posted to the "subscribe to topic".

After registration, the chat client 308 subscribes to "User-1.M" 302. When other chat clients post to this queue the posted messages are retrieved and displayed to the user in a chat window and/or via another presentation technique. The box titled "Display Chat Messages" 316 provides this logic.

In one embodiment of the present disclosure, a common facility in all chat clients is the notion of a "buddy list" 318. A buddy list is a list of chat client names that a user frequently chats with and chooses to monitor. It gives the user a visual display of who is available to chat and who is not. Clicking on one of the available names opens a chat window for that name. Messages typed in that window are posted to the message queue for that name. In one embodiment of the present disclosure, a chat window can only be opened to "chat clients" that are online and available to receive chat messages.

A chat client 308 subscribes to the status queues for each "chat client name" in its "buddy list" 318. The "buddy list" 318 and the availability status for each name in the list may be displayed to the user in a scrollable window, or otherwise presented to the chat client. This functionality may be performed in the "Display Buddy List" 320 logic.

A means for updating the code for the chat client itself may be also included. For example, a topic referred as "Update" 322 is used to update all clients. Each client subscribes to "Update" 322 and when updates to the client code are available they are posted to "Update" 322. When this happens each subscribed client receives a notice in its "Update" callback buffer 324. A methodology of the present disclosure in one embodiment provides for chat functions like buddy lists and the sending and receiving chat messages; while also offering exclusive features like the queuing of chat messages even when the respective chat client is off-line and the capability to broadcast messages to large groups of people or everyone at once. For example, while a user is disconnected from the chat server, the user's messages are queued so that the user can review them later. In one embodiment of the present disclosure, a chat message can be persisted to record chat sessions or even the entire chat message history of the chat server. These can be played back later to recreate one or more chat sessions.

Figure 4:
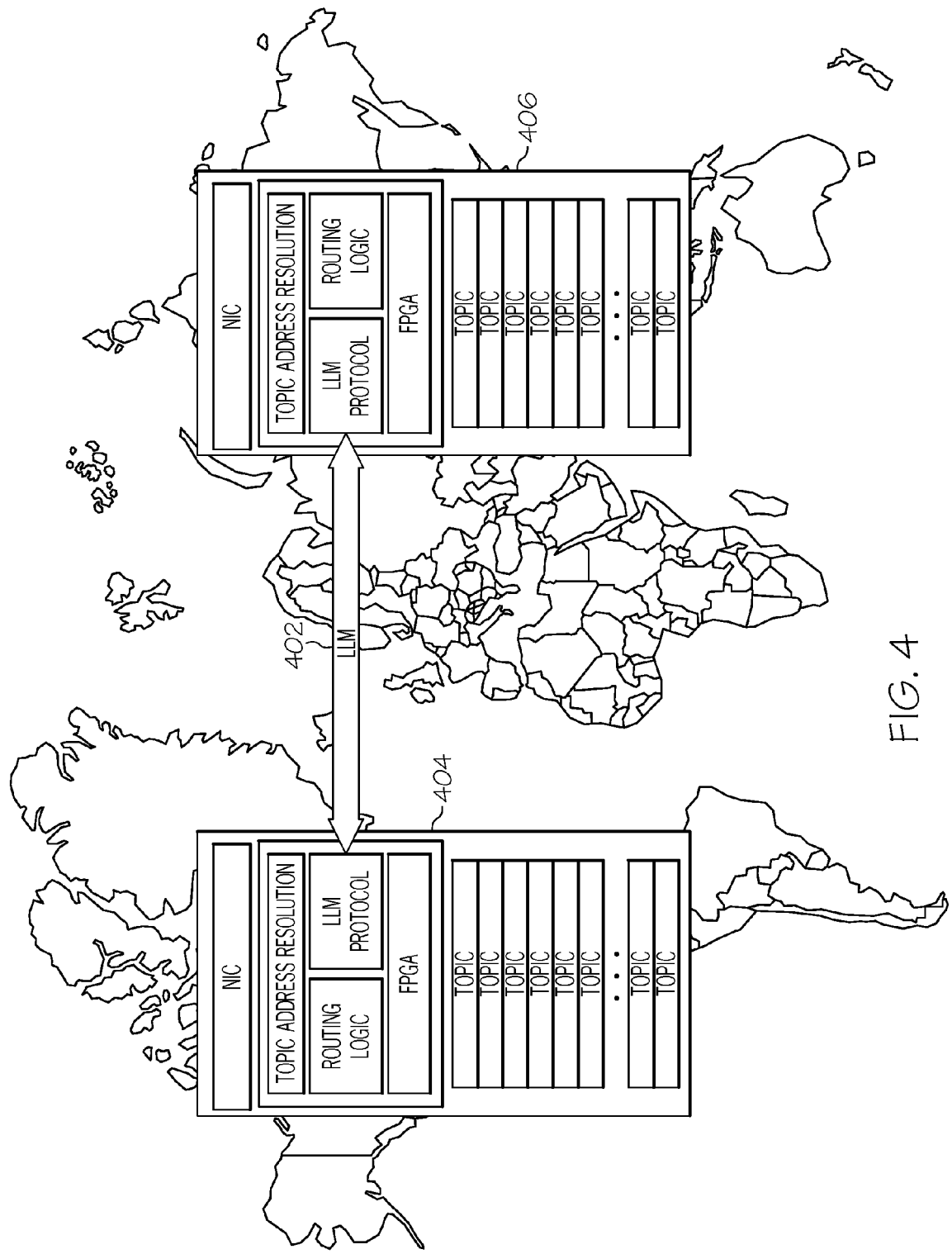
FIG. 4 illustrates a geographically distributed chat service in one embodiment of the present disclosure.

FIG. 4 illustrates a geographically distributed chat service in one embodiment of the present disclosure. That figure shows the concepts of the present disclosure distributed across a wide geographic area in one embodiment of the present disclosure. The LLM protocol 402 is used to optimally send messages from one location 404 to another 406. In this way, chat clients connected to a chat server in one geographical location (e.g., one country) can chat with chat clients located in another geographical location (e.g., another country). This idea is expandable to placing servers at multiple places around the world.

As described above, the methodology of the present disclosure in one embodiment provides for a publish-subscribe based instant messaging (IM) service, e.g., using low latency messaging server. Messages may be published in a message queue to chat clients subscribed to other chat clients (topic) using a low latency messaging server, wherein a topic is associated with the message queue and the topics in the message queue are clustered based on format (e.g., .s for status and .m for message). The published messages may be retrieved and/or stored without requiring a live chat session, e.g., without a user being on-line.

Figure 5:
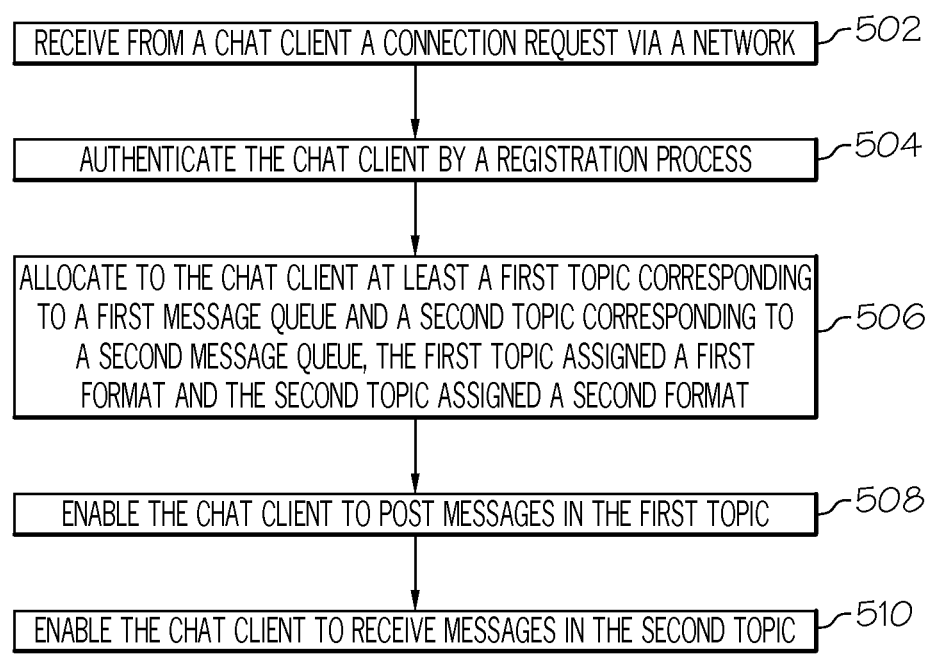
FIG. 5 is a flow diagram illustrating a method for a low latency messaging chat service in one embodiment.

FIG. 5 is a flow diagram illustrating a method for a low latency messaging chat service in one embodiment. At 502, a chat server may receive from a chat client a connection request via a network. At 504, the chat server may authenticate the chat client by a registration process. At 506, the chat server may allocate to the chat client at least a first topic corresponding to a first message queue and a second topic corresponding to a second message queue, the first topic assigned a first format and the second topic assigned a second format. In one embodiment of the present disclosure, the first topic is a message status queue and the second topic is a message queue. The first format describes availability status of the chat client and the second format describes payload of chat messages posted to the second topic. At 508, the chat server may enable the chat client to post messages in the first topic. In one embodiment, only the chat client can post to the first topic. At 510, the chat server may enable the chat client to receive messages in the second topic.

The chat server may also allocate an update topic to the chat client, enable the chat client to subscribe to the update topic, and post code updates to the update topic. The chat server may save messages posted on the second topic even when the chat client is off-line.

Figure 6:
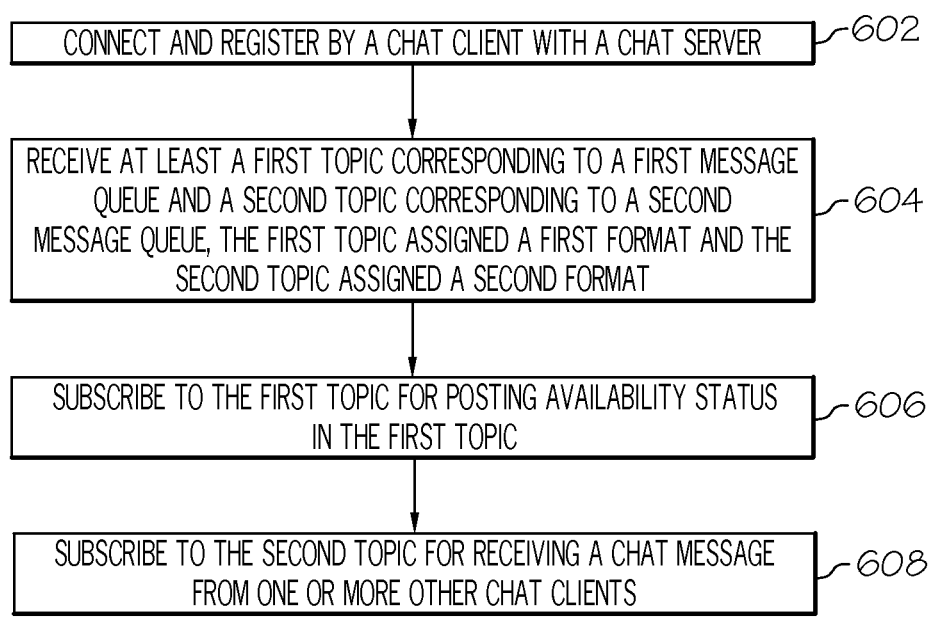
FIG. 6 is a flow diagram illustrating a method for a client in a low latency messaging chat service.

FIG. 6 is a flow diagram illustrating a method for a client in a low latency messaging chat service. At 602, a chat client may connect and register with a chat server. At 604, the chat client may receive at least a first topic corresponding to a first message queue and a second topic corresponding to a second message queue allocated to the chat client. The first topic is assigned a first format and the second topic is assigned a second format. At 606, the chat client may subscribe to the first topic for posting availability status in the first topic. At 608, the chat client may subscribe to the second topic for receiving a chat message from one or more other chat clients.

In another aspect, the chat client may also subscribe to an update topic, and update code associated with the chat client in response to a notification from the update topic. In yet another aspect, the chat client may subscribe to another chat user's status queue who is on a buddy list of the chat user.

The methodologies of the present disclosure may be implemented on one or more computer systems. The computer system is only one example of a suitable processing system and is not intended to suggest any limitation as to the scope of use or functionality of embodiments of the methodology described herein. The processing system may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units, a system memory, and a bus that couples various system components including system memory to processor. The processor may include a module that performs the methods described herein. The module may be programmed into the integrated circuits of the processor, or loaded from memory, storage device, or network or combinations thereof.

Bus may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory can include computer system readable media in the form of volatile memory, such as random access memory (RAM) and/or cache memory or others. Computer system may further include other removable/non-removable, volatile/non-volatile computer system storage media. By way of example only, storage system can be provided for reading from and writing to a non-removable, non-volatile magnetic media (e.g., a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus by one or more data media interfaces.

Computer system may also communicate with one or more external devices such as a keyboard, a pointing device, a display, etc.; one or more devices that enable a user to interact with computer system; and/or any devices (e.g., network card, modem, etc.) that enable computer system to communicate with one or more other computing devices. Such communication can occur via Input/Output (I/O) interfaces.

Still yet, computer system can communicate with one or more networks such as a local area network (LAN), a general wide area network (WAN), and/or a public network (e.g., the Internet) via network adapter. As depicted, network adapter communicates with the other components of computer system via bus. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for a low latency messaging chat service, comprising:
   receiving from a chat client a connection request via a network;
   authenticating the chat client by a registration process;
   allocating to the chat client at least a first topic corresponding to a first message queue and a second topic corresponding to a second message queue, the first topic assigned a first format and the second topic assigned a second format, a message switch comprising the first message queue and the second message queue, the message switch ingesting a message to the chat client, removing an enclosed topic and routing the message to the second message queue corresponding to the enclosed topic;
   allowing the chat client to post messages in the first topic; and
   allowing the chat client to receive messages in the second topic,
   wherein the first topic comprises a message status queue formatted for conveying an availability status of the chat client to other chat clients, and the second topic comprises a message queue to which the other chat clients post messages to the chat client,
   the chat client exclusively allowed to subscribe to the second topic, wherein the second message queue sends exclusively to the chat client all messages the second message queue receives.

2. The method of claim 1, wherein the second format describes payload of chat messages posted to the second topic.

3. The method of claim 1, further comprising:
   allocating an update topic to the chat client; and
   enabling the chat client to subscribe to the update topic; and
   posting code updates to the update topic.

4. The method of claim 1, further comprising:
   saving messages posted on the second topic even when the chat client is off-line.

5. The method of claim 1, wherein only the chat client can post to the first topic.

6. The method of claim 1, wherein the method is performed by a low latency messaging switch.

7. A method for a low latency messaging chat service, comprising:
   connecting and registering by a chat client with a chat server;
   receiving at least a first topic corresponding to a first message queue and a second topic corresponding to a second message queue, the first topic assigned a first format and the second topic assigned a second format;
   subscribing to the first topic for posting availability status in the first topic; and
   subscribing to the second topic for receiving a chat message from one or more other chat clients,
   wherein the first topic comprises a message status queue formatted for conveying an availability status of the chat client to other chat clients, and the second topic comprises a message queue to which the other chat clients post messages to the chat client, a message switch comprising the first message queue and the second message queue, the message switch ingesting a message to the chat client, removing an enclosed topic and routing the message to the second message queue corresponding to the enclosed topic,
   the chat client exclusively allowed to subscribe to the second topic, wherein the second message queue sends exclusively to the chat client all messages the second message queue receives.

8. The method of claim 7, wherein only the chat client can post to the first topic.

9. The method of claim 7, wherein the second format describes payload of chat messages posted to the second topic.

10. The method of claim 7, further comprising:
    subscribing to an update topic; and
    updating code associated with the chat client in response to a notification from the update topic.

11. The method of claim 7, further comprising:
    subscribing to another chat user's status queue who is on a buddy list of the chat user.

12. The method of claim 1, wherein the allowing the chat client to receive messages in the second topic comprises allowing the chat client to exclusively subscribe to the second topic, while giving the other chat clients write privileges to the second topic.

* * * * *